United States Patent
Aleman

(10) Patent No.: US 6,648,290 B1
(45) Date of Patent: Nov. 18, 2003

(54) BEVERAGE CONTAINER ASSEMBLY

(76) Inventor: Sandra L. Aleman, 137 Saratoga St. #2, East Boston, MA (US) 02128

( * ) Notice: Subject to any disclaimer, the term of this patent is extended or adjusted under 35 U.S.C. 154(b) by 0 days.

(21) Appl. No.: 10/076,564

(22) Filed: Feb. 15, 2002

(51) Int. Cl.[7] .................................................. A47K 1/08
(52) U.S. Cl. ................. 248/311.2; 248/230.7
(58) Field of Search ............................. 248/311.2, 313, 248/316.7, 218.4, 230.6, 230.7, 231.71, 229.14, 229.25, 228.6

(56) References Cited

U.S. PATENT DOCUMENTS

| | | | |
|---|---|---|---|
| 3,458,095 A | | 7/1969 | Stall |
| 4,063,701 A | * | 12/1977 | Wray ..................... 248/292.14 |
| 4,071,976 A | | 2/1978 | Chernewski |
| 4,606,523 A | | 8/1986 | Statz et al. |
| 4,878,642 A | * | 11/1989 | Kirby, Jr. ................. 248/230.1 |
| 5,022,626 A | | 6/1991 | Nozel et al. |
| 5,320,319 A | | 6/1994 | Winger et al. |
| 5,356,107 A | * | 10/1994 | Sinohuiz ................. 248/223.41 |
| 5,400,990 A | * | 3/1995 | Frankel ..................... 211/113 |
| 5,853,158 A | * | 12/1998 | Riggle ........................ 248/103 |
| D413,769 S | | 9/1999 | Mason |

* cited by examiner

Primary Examiner—Ramon O. Ramirez

(57) ABSTRACT

A beverage container assembly for improving access to and replacement of beverage containers by children to decrease the potential for spillage. The beverage container assembly includes a main container portion including a bottom wall and a perimeter wall, which extends upwardly from a perimeter edge of the bottom wall, the main container portion is for holding a beverage container; and a coupling portion for selectively coupling the assembly to a support member such as a rail of a baby seat, the coupling portion is operationally coupled to the main container.

6 Claims, 3 Drawing Sheets

BEVERAGE CONTAINER ASSEMBLY

BACKGROUND OF THE INVENTION

1. Field of the Invention

The present invention relates to cup holders and more particularly pertains to a new beverage container assembly for improving access to and replacement of beverage containers by children to decrease the potential for spillage.

2. Description of the Prior Art

The use of cup holders is known in the prior art. U.S. Pat. No. 5,320,319 describes a device for holding a container by engaging a lip on the container. Another type of cup holders is U.S. Pat. No. 5,022,626 having a means for bolting the cup holder to an interior of a vehicle.

While these devices fulfill their respective, particular objectives and requirements, the need remains for a device that has certain improved features such as the capability of being temporarily attached to a variety of support types.

SUMMARY OF THE INVENTION

The present invention meets the needs presented above by providing a coupling portion which clamps to a variety of support types including sides or rails of child safety seats.

Still yet another object of the present invention is to provide a new beverage container assembly that provides a larger opening to aid small children in returning their cup to the holder without spillage.

Even still another object of the present invention is to provide a new beverage container assembly that can rapidly be moved from support to support without tools.

To this end, the present invention generally comprises a main container portion including a bottom wall and a perimeter wall, which extends upwardly from a perimeter edge of the bottom wall, the main container portion is for holding a beverage container; and a coupling portion for selectively coupling the assembly to a support member such as a rail of a baby seat, the coupling portion is operationally coupled to the main container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
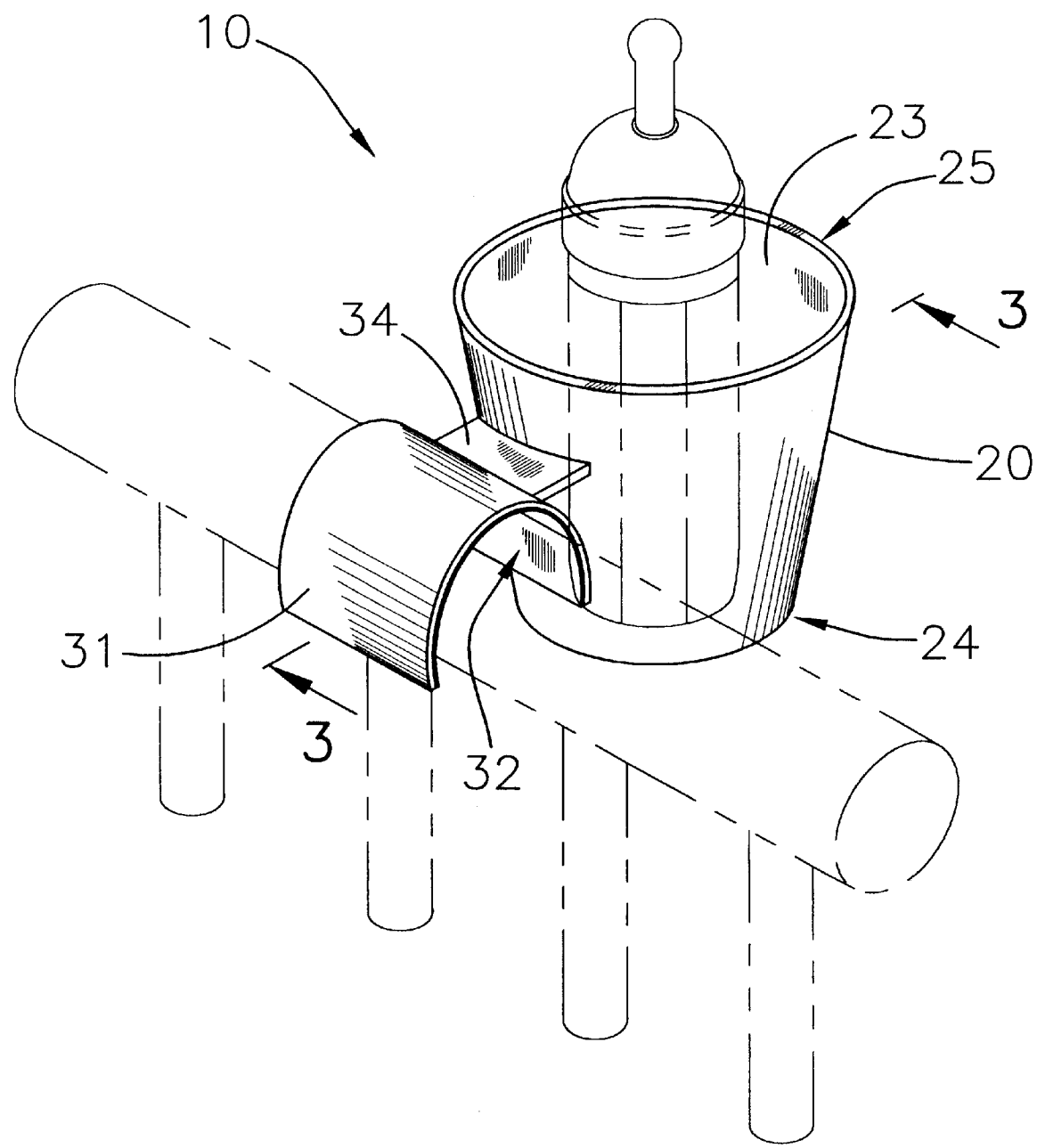
FIG. 1 is a schematic perspective view of a new beverage container assembly in use according to the present invention.
Figure 2:
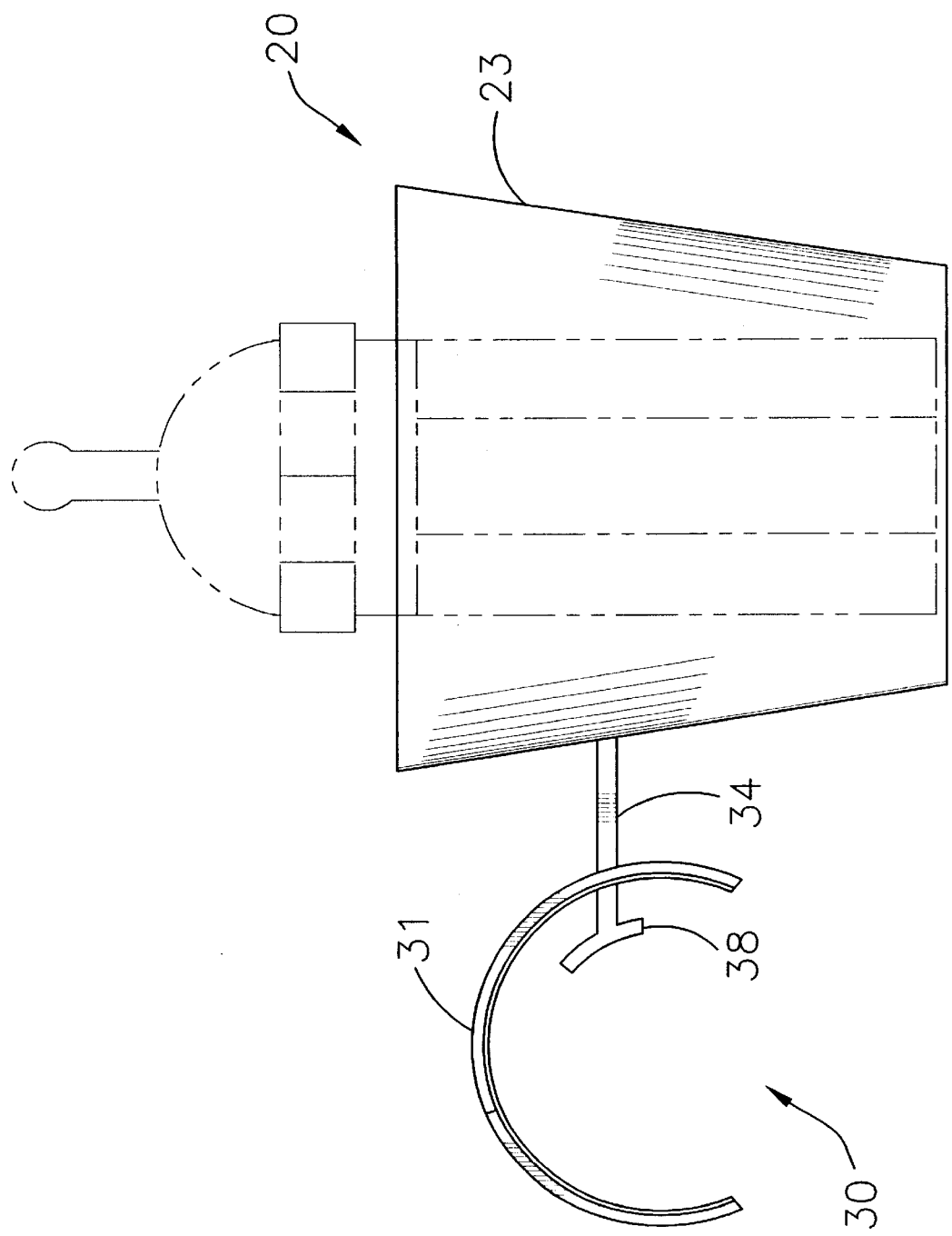
FIG. 2 is a schematic side view of the present invention.
Figure 3:
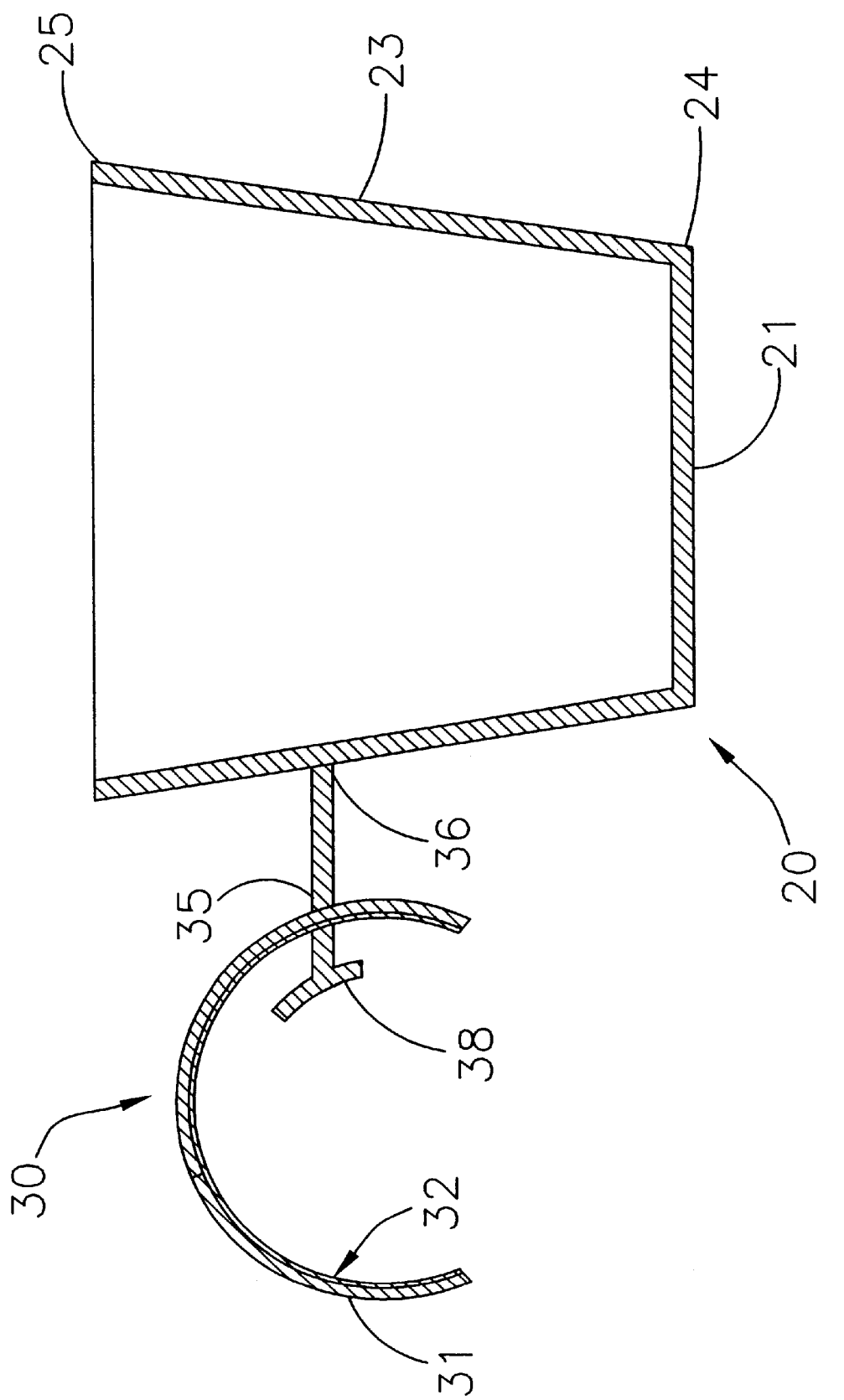
FIG. 3 is a schematic cross-sectional view of the present invention.

With reference now to the drawings, and in particular to FIGS. 1 through 3 thereof, a new beverage container assembly embodying the principles and concepts of the present invention and generally designated by the reference numeral 10 will be described.

As best illustrated in FIGS. 1 through 3, the beverage container assembly 10 generally comprises a main container portion 20 and a coupling portion 30.

The main container portion 20 includes a bottom wall 21 and a perimeter wall 23, which extends upwardly from a perimeter edge of the bottom wall 21. The main container portion 20 is for holding a beverage container.

The coupling portion 30 is used for selectively coupling the assembly 10 to a support member such as a rail of a baby seat. The coupling portion 30 is operationally coupled to the main container portion 20.

The perimeter wall 23 tapers outwardly as the perimeter wall 23 extends from the bottom wall 21 such that a distal end 25 of the perimeter wall 23 has a diameter substantially greater than a diameter of a proximal end 24 coupled to the bottom wall 21. The perimeter wall 23 tapers to facilitate access to the beverage container.

The perimeter wall 23 is positioned such that a longitudinal axis of the perimeter wall 23 is positioned approximately thirty degrees to a plane defined by a surface of the bottom wall 21.

The main container portion 20 comprises a polymeric material.

The coupling portion 20 may further comprise a clamping member 31 designed for selectively engaging the support. The clamping member 31 is substantially c-shaped for facilitating placement over the support such that a first surface 32 of the clamping member 31 abuts an exterior portion of the support.

The clamping member 31 is resiliently flexible such that the clamping member 31 provides a clamping force for engaging the support.

The coupling portion 30 may further comprises a coupling member 34 for spacing the main container portion 20 from the support. The coupling member 34 includes a first end 35 coupled to the clamping member 31. The coupling portion 34 also includes a second end 36 coupled to the main container portion 20.

The main container portion 20 has a first diameter adjacent to the proximal end 24 of the perimeter wall 23 of approximately two inches. The main container portion 20 also has a second diameter adjacent to the distal end 25 of the perimeter wall 23 of approximately four inches.

The main container portion 20 has a height between the range of three and five inches inclusive.

The clamping member 31 may also comprise a polymeric material.

The clamping member 31 may be integrally coupled to the coupling member 34, and the coupling member 34 may be integrally coupled to the main container portion 20.

The coupling portion 30 further comprises an adjustment member 38 for adjusting a compressive force applied to the support.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A beverage container assembly comprising:

a main container portion having a bottom wall and a perimeter wall extending upwardly from a perimeter edge of said bottom wall, said main container portion being for holding a beverage container;

a coupling portion for selectively coupling said assembly to a support member such as a rail of a baby seat, said coupling portion being operationally coupled to said main container;

wherein said perimeter wall tapering outwardly as said perimeter wall extends from said bottom wall such that a distal end of said perimeter wall having a diameter substantially greater than a diameter of a proximal end coupled to said bottom wall, said perimeter wall tapering to facilitate access to the beverage container;

said perimeter wall being positioned such that a longitudinal axis of said perimeter wall is positioned approximately thirty degrees to a plane defined by a surface of said bottom wall;

wherein said main container portion comprises a polymeric material;

said coupling portion further comprises a clamping member adapted for selectively engaging the support, said clamping member being substantially c-shaped for facilitating placement over the support such that a first surface of said clamping member abuts an exterior portion of the support;

wherein said clamping member being resiliently flexible such that said clamping member provides a clamping force for engaging the support;

wherein said coupling portion further comprises a coupling member for spacing said main container portion from the support, said coupling member having, a first end coupled to said clamping member, said coupling member having a second end coupled to said main container portion; and said coupling portion further comprises an adjustment member for adjusting a compressive force applied to the support.

2. The assembly of claim 1, wherein said main container portion having a first diameter adjacent to said proximal end of said perimeter wall, said first diameter being approximately two inches, said main container portion having a second diameter adjacent to said distal end of said perimeter wall, said second diameter being approximately four inches.

3. The assembly of claim 1, wherein said main container portion having a height between the range of three and five inches inclusive.

4. The assembly of claim 1, wherein said clamping member comprising a polymeric material.

5. The assembly of claim 1, wherein said clamping member being integrally coupled to said coupling member, said coupling member being integrally coupled to said main container portion.

6. The assembly of claims 1, wherein said main container portion having a first diameter adjacent to said proximal end of said perimeter wall, said first diameter being approximately two inches, said main container portion having a second diameter adjacent to said distal end of said perimeter wall, said second diameter being approximately four inches;

said main container portion having a height between the range of three and five inches inclusive;

said clamping member comprising a polymeric material;

said clamping member being integrally coupled to said coupling member, said coupling member being integrally coupled to said main container portion; and said coupling portion further comprises an adjustment member for adjusting a compressive force applied to the support.

* * * * *